United States Patent
Bernard et al.

(10) Patent No.: US 8,552,137 B2
(45) Date of Patent: Oct. 8, 2013

(54) COMPOSITION COMPRISING SILYL DERIVATIVE AS DEHYDRATING AGENT

(75) Inventors: Jean-Marie Bernard, Saint-Laurent d'Agny (FR); Philippe Barbeau, Genas (FR)

(73) Assignee: Vencorex France, Saint-Priest (FR)

( * ) Notice: Subject to any disclaimer, the term of this patent is extended or adjusted under 35 U.S.C. 154(b) by 150 days.

(21) Appl. No.: 13/108,720

(22) Filed: May 16, 2011

(65) Prior Publication Data

US 2011/0282002 A1  Nov. 17, 2011

Related U.S. Application Data

(63) Continuation-in-part of application No. 11/794,083, filed as application No. PCT/FR2005/003194 on Dec. 20, 2005, now abandoned.

(30) Foreign Application Priority Data

Dec. 23, 2004 (FR) ...................................... 04 13847

(51) Int. Cl.
*C08G 18/02* (2006.01)

(52) U.S. Cl.
USPC .................................. 528/48; 528/51; 528/52

(58) Field of Classification Search
USPC .............................................. 528/48, 51, 52
See application file for complete search history.

(56) References Cited

U.S. PATENT DOCUMENTS

| 3,598,852 | A | 8/1971 | Berger et al. |
| 4,412,073 | A | 10/1983 | Robin |
| 4,762,879 | A | 8/1988 | Letoffe et al. |

FOREIGN PATENT DOCUMENTS

| EP | 0246170 A1 | 11/1987 |
| EP | 0765893 A1 | 4/1997 |

*Primary Examiner* — Kuo-Liang Peng

(74) *Attorney, Agent, or Firm* — Buchanan Ingersoll & Rooney PC

(57) ABSTRACT

Disclosed is a compositions comprising isocyanate sub-composition comprising by weight not more than 5% of diisocyanate monomers, a dehydrating agent selected among compounds bearing dihydrocarbylsilyl groups bonded to a metalloid of the chalcogen column or to an atom of the nitrogen column. The invention is applicable to the coatings industry, in particular paints and adhesives.

10 Claims, No Drawings

COMPOSITION COMPRISING SILYL DERIVATIVE AS DEHYDRATING AGENT

This application is a continuation-in-part of U.S. application Ser. No. 11/794,083, filed on Jun. 2, 2008, which is a national phase of International Application No. PCT/FR2005/003194, filed Dec. 20, 2005, published in French as International Publication No. WO 2006/070100 A1 on Jul. 6, 2006, and claims priority of French Application No. 0413847, filed Dec. 23, 2004, each hereby expressly incorporated by reference in its entirety and each assigned to the assignee hereof.

The present invention relates to an isocyanate composition exhibiting good mixing properties, more particularly to the use of silylated derivatives as dehydrating agents to improve the compatibility of the isocyanate composition and various solvents used in the field of crosslinking of for instance coatings and adhesives.

Polyisocyanate compositions are typically formed from derivatives resulting from oligocondensation of di, tri or tetraisocyanates and are well known in the art. Crosslinking of isocyanate functional groups with co-reactants having abstractable hydrogen(s) is generally carried out in solvents, although the amount of solvent has been significantly reduced in recent years due to increasingly strict regulations.

Co-reactants and other additional components, such as solvents comprising impurities imparting polyisocyanate reactions. Among these impurities, those which exhibit functional groups having abstractable hydrogen(s) are liable to be detrimental. One of the awkward impurities is water present in additional components and solvents. This is particularly relevant for polar solvents (see Vogel's Textbook of Production Organic 5th edition Amedis 5, page 1442). Solvents capable of dissolving at least 0.5% by weight of water under ambient conditions are particularly affected by this issue. Hydrolysis reactions are particularly harmful when water is dissolved in an additional component and especially in a solvent. Furthermore, the content of isocyanate functional group decreases. This hydrolysis reaction is awkward on two accounts: first, there is release of carbon dioxide gas and, secondly, a risk of urea formation. It is for this reason desirable to find a technique making it possible to prevent hydrolysis reactions.

Release of carbon dioxide gas is a disadvantage in storage with risk of excessive pressure, or even explosion, in containers holding isocyanate compositions. Use of conventional dehydrating agents is inadequate as the isocyanate functional group is itself extremely avid for water and is frequently used as water absorber. This is why one of the aims of the present invention is to find a dehydrating agent being capable of preventing formation of carbon dioxide gas and insoluble urea by the presence of the moisture in for instance poorly dehydrated components. Another aim of the present invention is to provide a technique which can be used for isocyanate functional groups of aliphatic nature and thus for aliphatic monomers, their mixtures and even for the mixture of aliphatic and aromatic monomers. Yet another aim of the present invention is to provide a technique making it possible to facilitate mixing of isocyanate compositions with solvents of standard grade not normally recommended for use with isocyanates and not dehydrated beforehand, without harming the storability of said isocyanate compositions, in particular those obtained after or during mixing with a solvent of hygroscopic nature. Another aim of the present invention is to provide isocyanate compositions which exhibit good resistance to moisture making it possible to withstand, without damage, frequent opening and closing of containers holding said isocyanate compositions without taking restrictive precautions. These aims and others which will become apparent subsequently are achieved by means of a composition comprising at least one isocyanate sub-composition, having at most 5%, such as at most 2% or even at most 1%, by weight of diisocyanate monomers, at least one dehydrating agent of formula

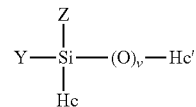

wherein Z is a hydrocarbyl, a silanoxanyl or a silazanyl group, Hc and Hc' independently is a hydrocarbyl group having at most 15 carbon atoms, v is 0 or 1, and Y is
i) an amino group, optionally having a substituent selected from the group consisting of a residue of an oxygen acid after elimination of a hydroxyl group, a hydrocarbyl group, a trihydrocarbylsilyl group, and a group of formula

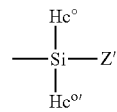

wherein Hc°, Hc°' and Z' are as previously defined for Hc, Hc' and Z, or
ii) a selenium, sulfur or oxygen atom, having a substituent being a residue of an oxygen acid, such as a carboxylic, a hydrocarbyl sulfuric, a sulfonic, a sulfinic, a phosphoric, a phosphonic or a phosphinic acid, after elimination of a hydroxyl group,
and
at least one non-alkylatable organic or inorganic base in an amount of at least 0.1 time, preferably at least 2 times, the amount of dihydrocarbylsilylene expressed as silicon atom equivalent.

Said dehydrating agent has in preferred embodiments of the present invention a content of dihydrocarbylsilylene groups of at least 0.1% and at most 3% expressed as weight of silicon atom calculated on the amount of resulting monomer units.

The composition of the present invention suitably additionally comprises at least one polyfunctional sub-composition having abstractable hydrogens, at least one surface active agent and/or at least one solvent, such as a hygroscopic solvent having a polar functional group. Of course, although this is not preferred, said sub-composition can be used with conventional known in the art dehydrating agents.

Particularly advantageous surface active agents include those obtained by grafting to the isocyanate a molecule having polyalkylene oxide, such as polyethylene oxide groups. This can be carried out by condensation(s) between an isocyanate functional group and a polyalkylene oxide, at least one of the two ends of which carries a functional group possessing abstractable hydrogen, in particular an alcohol or an amine functional group. The surface active agent can also be selected from other ionic compounds, such as an alkyl sulfate or phosphate, an alkylphosphonate, an alkylphosphinate, an alkylsulfonate, a fatty acid salt and/or a zwitterionic salt, and from non-ionic compounds.

Said hydrocarbyls are suitably and preferably selected from the group consisting of aryls and alkyls, such as methyl, ethyl, propyl and butyl groups. The term alkyl, which encompasses aralkyls, is taken from an alkyl alcohol from which the hydroxyl group has been removed.

Advantageously, the dihydrocarbylsilyl groups have at most 8, preferably at most 7, and more preferably at most 4, carbon atoms. It is desirable for dihydrocarbylsilyl groups to have at most 8, preferably at most 7, and more preferably at most 4, carbon atoms and for trihydrocarbylsilyls to have at most 10, preferably at most 9, and more preferably at most 6, carbon atoms. Said dihydrocarbylsilyl groups can, furthermore, be a member of a ring.

Said non-alkylatable organic or inorganic base is preferably a relatively weak base that do not react with isocyanate functional groups. Preferred bases include tertiary amines and tertiary phosphines which are at least partially aromatic, such as mono, di or triaromatic (mono, di or triaryl).

Said dehydrating agent is in especially preferred embodiments of the present invention selected from the group consisting of bis-trimethylsilylacetamide, bis-trimethylsilylurea, hexamethyldisilazane and trimethylsilylphosphate.

The present invention is particularly advantageous when a hygroscopic solvent and/or of a solvent having a high affinity for water, such as a solvent capable of dissolving or being miscible with at least 5%, such as at least 10%, by weight of water, is used.

Of course, although this is not preferred, said sub-composition can be used with conventional dehydrating agents.

The following non-limiting examples illustrate the invention.

The composition used in this study is as follows:

methoxypropyl acetate (MPA): 55% by weight added at the last moment and resulting in the presence of 500 ppm of water;

hydrophilic polyisocyanate composition:
4.66% phosphate esterified with a polyethoxylated alcohol comprising 13 carbon atoms and 6 ethylene oxide units; mono/di ratio 70/30;
4.66% phosphate esterified by a polyethoxylated alcohol comprising 8 ethylene oxide units; mono/di ratio 70/30 4.66%; 4% nonionic;
2.22% dimethylcyclohexylamine (DMCHA); q.s. for 100% isocyanate composition based on HDI of low viscosity and exhibiting a ratio of trimer to the total weight of 0.6 (mathematical rounding):

NCO 23%;

viscosity (23° C.) 600 mPa·s;

equivalent weight 183;

solids content 100%; and functionality 3.25

The assaying of the water (by Karl-Fischer) shows that the curing agent composition comprises, on average, 0.5% by weight.

Evaluated dehydrating agents studied are:

| | |
|---|---|
| Comparative: | oxazoline (Incozol 2 from Industrial Copolymer) |
| Embodiment silylated structures: | bistrimethylsilylacetamide (BSA) bistrimethylsilylurea (BSU) hexamethyldisilazane (HMDZ) trimethylsilyl phosphate (TMSP) |

All silylated products were supplied by Aldrich.

Compositions

The compositions of evaluated formulations are given in Table I below.

TABLE I

Isocyanate formulations studied

| | Reference and distinctive components added to the mixture, as % by weight | | | | | | Results: existence of an evolution of gas (ev), measured total volume given off (vg) and observation | | |
|---|---|---|---|---|---|---|---|---|---|
| Ref. | Level of water | Incozol 2 | BSA | BSU | HMDZ | TMSP | (ev) | (vg) | Observation of the liquid |
| 1* | 0.05 | | | | | | no | | Slight turbidity after 21 d at 40° C. |
| 2* | 0.55 | | | | | | yes | 24 ml after 24 h | Formation of a cloudy gel |
| 3* | 0.05 | | 0.568 | | | | no | | Transparent liquid after 21 d at 40° C. |
| 4* | 0 | | | 0.572 | | | no | | Transparent liquid after 21 d at 40° C. |
| 5* | 0 | | | | 0.45 | | no | | Transparent liquid after 21 d at 40° C. |
| 6* | 0 | | | | | 0.588 | no | | Transparent liquid after 21 d at 40° C. |
| 12 (control) | 0.15 | | | | | | yes | 5 ml | White precipitate |
| 13 | 0.15 | | 1.558 | | | | no | | Transparent liquid after 21 d at 40° C. |
| 14 | 0.15 | | | 1.566 | | | no | | Transparent liquid after 21 d at 40° C. |
| 7* (comparative) | 0.55 | 6.97 | | | | | yes | 7.5 ml after 5 h | Clear liquid if storage at 40° C. |
| 8* | 0.55 | | 6.212 | | | | no | | Transparent liquid after 21 d at 40° C. |

*present in the mixture before further addition of water approximately 500 ppm

Mixtures 3 to 10 were formulated with the addition of dehydrating agents while taking into account the 500 ppm added during the addition of the acetate initially to mixture 1 before further addition of water. In all cases, the water added is added last (i.e., after introduction of dehydrating agents) so as to avoid any reaction with the NCO functional groups.

Mixtures 8 and 11 spent 30 min. in an ultrasonic bath in order to ensure the dissolution of BSU and TMSP.

Monitoring Evolution of Gas

Monitoring of the evolution of gas in the presence and absence of a dehydrating agent according to embodiments of the present invention was carried out by measuring, using a graduated syringe, the volume of gas produced by 27 g of solution in a flask closed using a septum. The isocyanate composition was kept at 40° C. The measurement was carried out daily. After perforation by the syringe in order to quantify the volume of gas given off, the septum was replaced by a new septum.

Result

Mixtures 3, 4, 5 and 6 remain unchanged (colorless liquids without apparent evolution) and do not exhibit any significant evolution of gas over the duration of the stability test at 40° C. for 21 days. Mixture 2, comprising more than 5000 ppm of water, changes after only a few hours at 40° C., a slightly cloudy chemical gel is observed in the closed flask. The measurement of the evolution of gas shows a strong evolution of 24 ml after 24 hrs at 40° C. This change corresponds to the expected reaction of the NCO functional groups with the water, resulting in the formation of $CO_2$. The influence of the dehydrating agents tested is clearly demonstrated through the results obtained with the mixtures comprising a dehydrating agent according to embodiments of the present invention. Mixture 7, comprising Incozol 2, degases after a few hours at 40° C. Moreover, the disappearance of water from the formulations was quantified by monitoring the level of water in formulations 13 and 14 over time by the Karl-Fischer method. Detailed results are given in enclosed Table II.

TABLE II

Kinetic monitoring of the consumption of water and of NCO functional group of mixtures 13 and 14

| Duration | Storage temperature (° C.) | Mixture 12 Amount of water in ppm | Mixture 13 Amount of water in ppm | Mixture 14 Amount of water in ppm |
|---|---|---|---|---|
| $t_0$ | 23° C. | 1500 | 1480 | 1480 |
|  | 40° C. |  |  |  |
| t = 20 min | 23° C. |  | 650 | 606 |
|  | 40° C. |  |  |  |
| t = 144 h | 23° C. |  | 63 | 66 |
|  | 40° C. |  | 56 | 19 |

The invention claimed is:

1. A composition comprising at least one isocyanate sub-composition, having at most 5% by weight of diisocyanate monomers, at least one dehydrating agent of formula

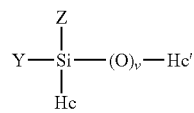

wherein Z is a hydrocarbyl, a silanoxanyl or a silazanyl group, Hc and Hc' independently are a hydrocarbyl group having at most 15 carbon atoms, v is 0 or 1, and Y is i) an amino group, optionally having a substituent selected from the group consisting of a residue of an oxygen acid after elimination of a hydroxyl group, a hydrocarbyl group, a trihydrocarbylsilyl group, and a group of formula

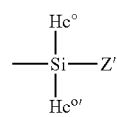

wherein Hc°, Hc°' and Z' are as previously defined for Hc, Hc' and Z, or ii) a selenium, sulfur or oxygen atom, having a substituent being a residue of an oxygen acid after elimination of a hydroxyl group, and at least one non-alkylatable organic or inorganic base, being an at least partially aromatic tertiary amine or tertiary phosphine, in an amount corresponding to at least 0.1 times the amount of dihydrocarbylsilylene, when expressed as silicon atom equivalents.

2. A composition according to claim 1, said sub-composition comprising at most 2% by weight of diisocyanate monomers.

3. A composition according to claim 1, said sub-composition comprising at most 1% by weight of diisocyanate monomers.

4. A composition according to claim 1, said oxygen acid being a carboxylic, a hydrocarbyl sulfuric, a sulfonic, a sulfonic, a phosphoric, a phosphonic or a phosphinic acid.

5. A composition according to claim 1, said base being present in an amount corresponding to at least 2 times the amount of dihydrocarbylsilylene, when expressed as silicon atom equivalents.

6. A composition according to claim 1, said composition additionally comprising a polyfunctional sub-composition having abstractable hydrogens.

7. A composition according to claim 1, said composition additionally comprising at least one surface active agent.

8. A composition according to claim 1, said composition additionally comprising a solvent.

9. A composition according to claim 8, said solvent being a hygroscopic solvent having a polar functional group.

10. A composition according to claim 1, said dehydrating agent being selected from the group consisting of bis-trimethylsilylacetamide, bis-trimethylsilylurea, hexamethyldisilazane and trimethylsilylphosphate.

* * * * *